(12) United States Patent
Denney

(10) Patent No.: US 7,658,258 B2
(45) Date of Patent: Feb. 9, 2010

(54) ALL TERRAIN VEHICLE SWEPT A-FRAME SUSPENSION AND CENTRAL SUPPORT TRUSS

(75) Inventor: Dan Denney, Nampa, ID (US)

(73) Assignee: Thorpe North & Western LLP, Sandy, UT (US)

(*) Notice: Subject to any disclaimer, the term of this patent is extended or adjusted under 35 U.S.C. 154(b) by 519 days.

(21) Appl. No.: 11/451,866

(22) Filed: Jun. 12, 2006

(65) Prior Publication Data
US 2007/0000715 A1 Jan. 4, 2007

Related U.S. Application Data

(60) Provisional application No. 60/689,730, filed on Jun. 10, 2005.

(51) Int. Cl.
*B62D 21/00* (2006.01)
(52) U.S. Cl. ...................................... 180/311
(58) Field of Classification Search ................ 180/312, 180/311; 296/203.01, 205; 280/781, 796, 280/798
See application file for complete search history.

(56) References Cited

U.S. PATENT DOCUMENTS

| | | | |
|---|---|---|---|
| 3,022,105 A | 2/1962 | Tjaarda | |
| 3,794,352 A * | 2/1974 | Popp | 280/209 |
| 4,217,970 A * | 8/1980 | Chika | 180/298 |
| 4,249,627 A | 2/1981 | Voll et al. | |
| 4,470,612 A | 9/1984 | Kent | |
| D301,849 S * | 6/1989 | Oba et al. | D12/87 |
| 4,902,033 A | 2/1990 | Tonomura | |
| 5,287,768 A | 2/1994 | Amborn et al. | |
| 6,302,420 B1 | 10/2001 | Sano | |
| 6,619,155 B2 * | 9/2003 | Brock | 74/512 |
| D500,707 S * | 1/2005 | Lu | D12/87 |
| D564,410 S * | 3/2008 | Lepage | D12/87 |
| D585,788 S * | 2/2009 | Burns | D12/87 |
| D586,695 S * | 2/2009 | Burns | D12/87 |
| D586,696 S * | 2/2009 | Burns | D12/87 |

OTHER PUBLICATIONS

Sandrocket, Jun. 8, 2005, 1 page.

* cited by examiner

*Primary Examiner*—Faye M. Fleming

(57) ABSTRACT

The present invention features an all terrain, four-wheeled vehicle frame for carrying at least two passengers in a side-by-side riding configuration, comprising a rigid, tubular frame body which provides for a forward passenger compartment having structural support members for carrying a pair of seats for the side-by-side passengers and a rearward engine compartment configured for receiving an engine, power train, and transmission for driving wheels of the vehicle. The vehicle frame also includes a vertical, load-bearing truss member extending generally along a longitudinal, central axis of the vehicle within the passenger compartment, the truss member forming a load-bearing structural member between the pair of seats.

17 Claims, 4 Drawing Sheets

ALL TERRAIN VEHICLE SWEPT A-FRAME SUSPENSION AND CENTRAL SUPPORT TRUSS

RELATED APPLICATIONS

This application claims benefit of U.S. Provisional Application Ser. No. 60/689,730 filed on Jun. 10, 2005.

BACKGROUND OF THE INVENTION

1. Field of the Invention

The present invention relates generally to all terrain vehicles.

2. Related Art

All terrain vehicles (hereinafter "ATV") typically have a short wheelbase which gives the ATV increased maneuverability and transportability over their counterpart recreational vehicles such as sandrails or a dune buggies. The shorter wheelbase, however, has an unattractive feature that is not shared by recreational vehicles with a wider wheelbase. Historically, ATVs with a shorter wheelbase require that the ATV occupancy area be raised to accommodate the decreased amount of space between the wheels. By raising the occupancy area, the center of gravity of the ATV is also raised. The result of a higher center of gravity is a decrease in vehicle stability and subsequent increased risk of rollovers.

Recreational vehicles such as sandrails and dune buggies with wider wheelbases are able to accommodate vehicle occupants lower in the vehicle plane and hence have a lower center of gravity. Thus, these types of vehicles share a smaller risk of rollover than their counterpart ATVs. As noted above, however, the wider wheelbase decreases the vehicles maneuverability as well as the ability to transport the recreational vehicle in the back of a standard pick up truck bed.

It would be advantageous to combine the attractive features of the lower center of gravity vehicles with the attractive features of the shorter wheelbase wheelbase vehicles such that the resultant ATV has the increased maneuverability and transportability of a smaller ATV and the lower center of gravity and resultant enhanced stability of the vehicles with the wider wheelbases.

SUMMARY OF THE INVENTION

It has been recognized that it would be advantageous to develop an all terrain, four-wheeled vehicle frame for carrying at least two passengers in side-by-side riding configuration. The vehicle frame comprises a rigid, tubular frame body providing (i) a forward passenger compartment having structural support members for carrying a pair of seats for the side-by-side passengers and (ii) a rearward engine compartment configured for receiving an engine, power train, and transmission for driving wheels of the vehicle. A load-bearing truss member with a vertical cross-section extends generally along a longitudinal, central axis of the vehicle within the passenger compartment and is coupled to a front portion and an opposing back portion of the tubular frame body and forming a load-bearing structural member between the pair of seats.

Additional features and advantages of the invention will be apparent from the detailed description which follows, taken in conjunction with the accompanying drawings, which together illustrate, by way of example, features of the invention.

DETAILED DESCRIPTION

Figure 1:
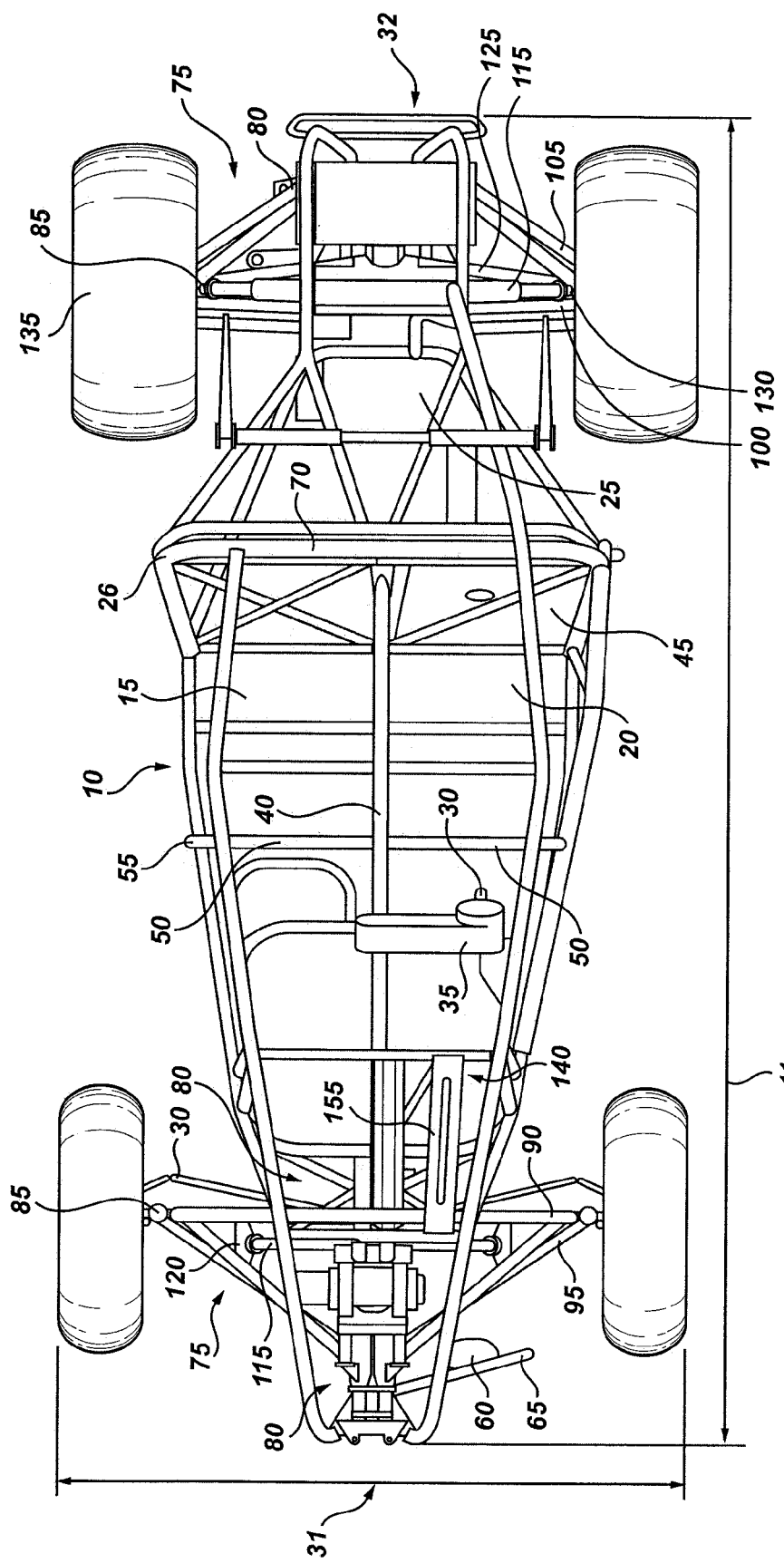
FIG. 1 is a plan view of the all terrain vehicle, tubular frame, suspension system, and attached wheels in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
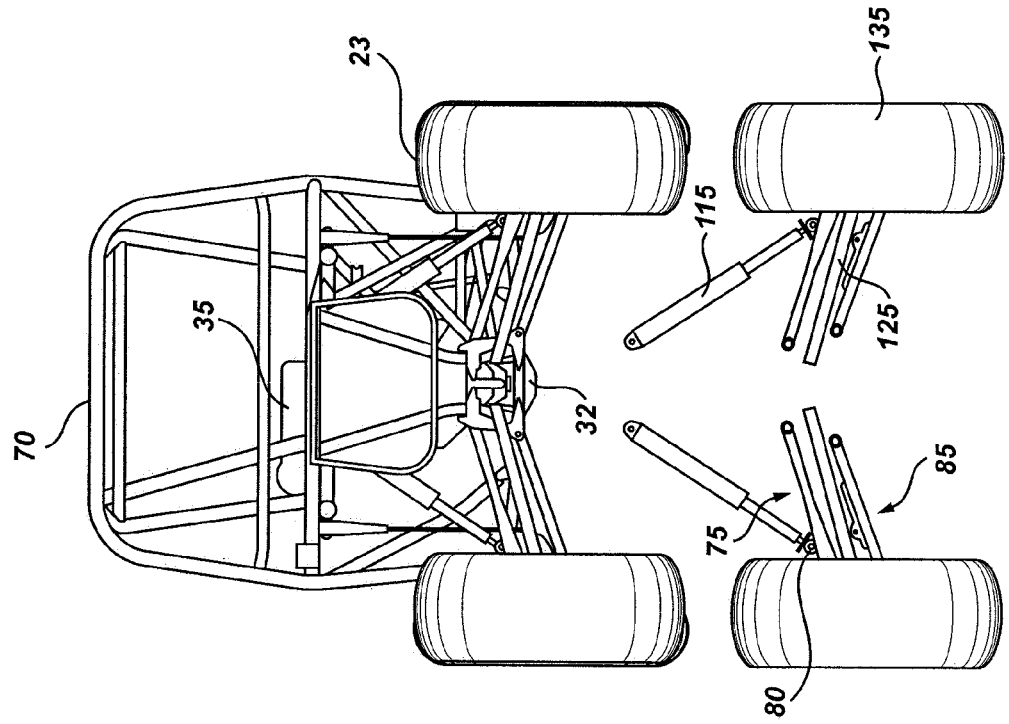
FIG. 2 is a rear view and front view of the all terrain vehicle; further presenting an embodiment of the front and rear suspension systems independent of the vehicle frame.
Figure 2:
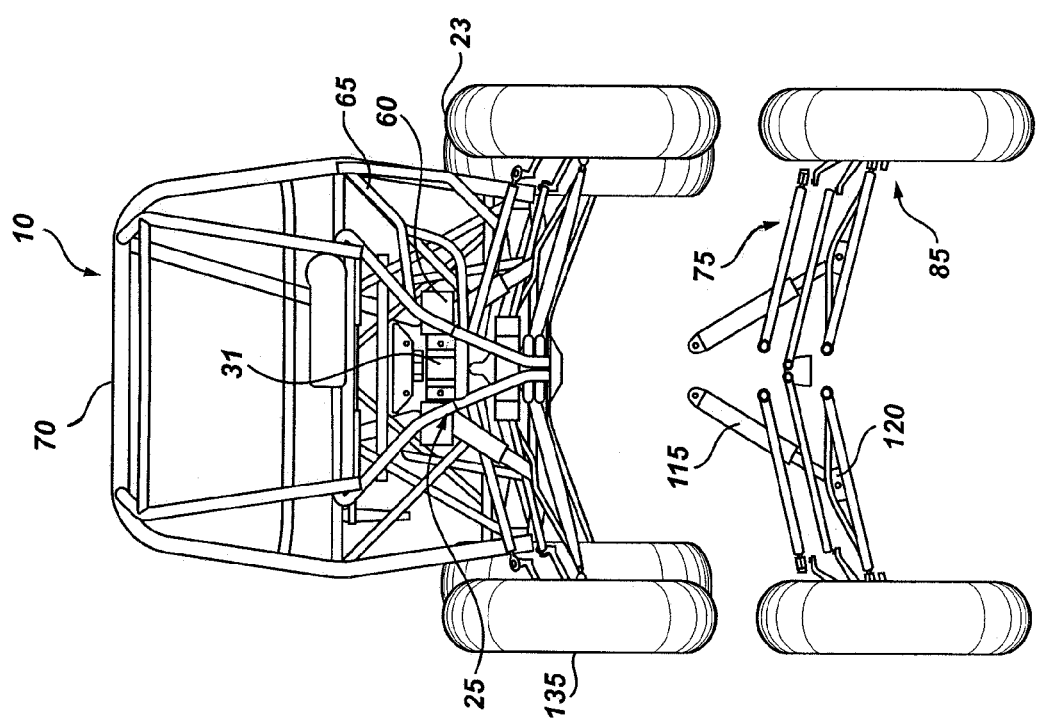
Figure 3:
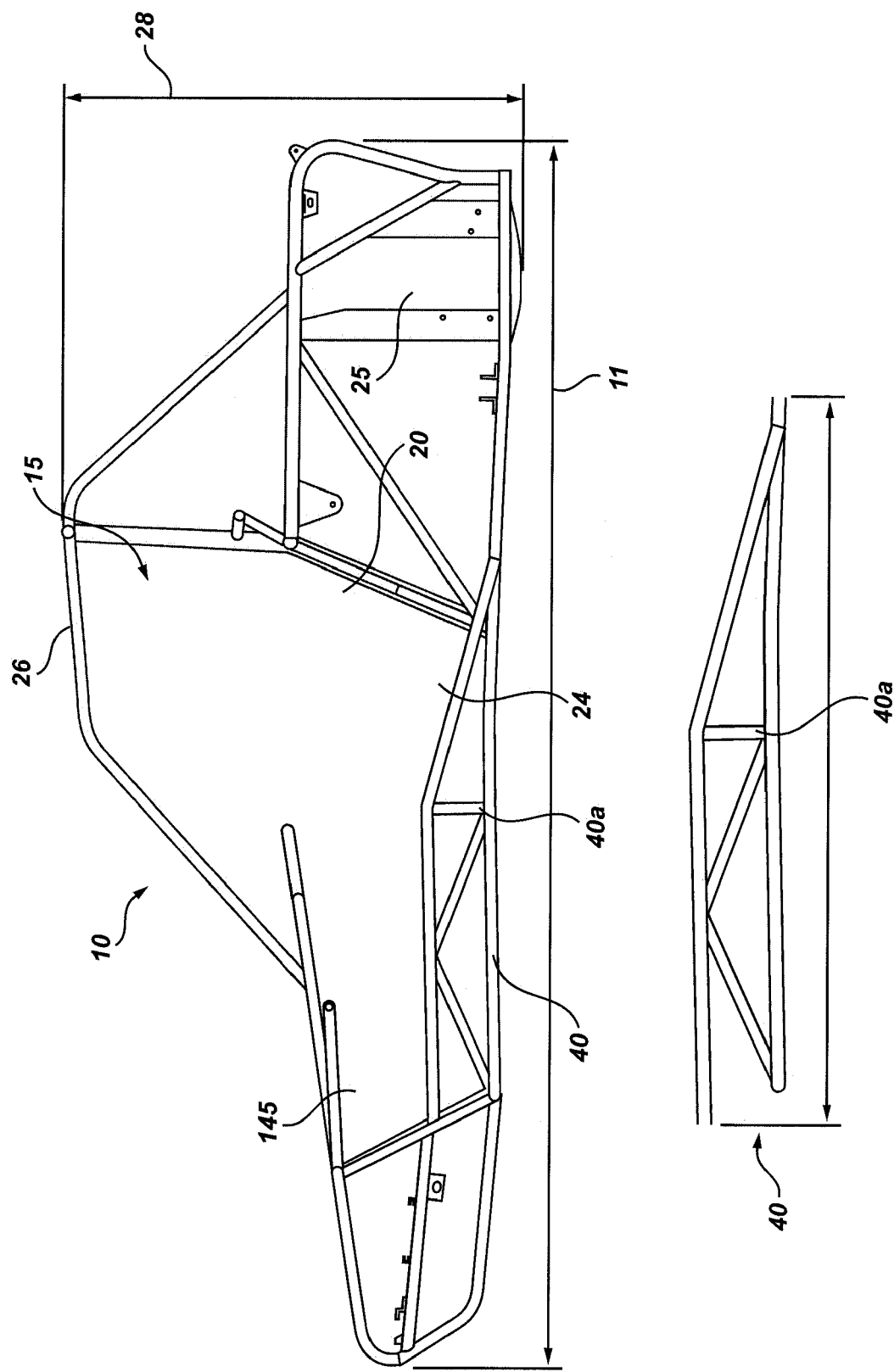
FIG. 3 is cross-sectional side view of the vehicle frame; further presenting the center vertical truss member in accordance with an embodiment of the present invention.

Referring to FIGS. 1, 2, and 3, in the preferred embodiment the vehicle frame is constructed from tubular-shaped steel alloy; however, the vehicle frame 10 may be assembled out of any rigid or semi-rigid material having a tubular or non-tubular construction ranging from about 0.5 to 2 inches in diameter. The overall longitudinal length of the vehicle is generally no more than 123 inches 11. The frame 10 is configured to allow construction of a passenger compartment 15 intended to provide adequate room to accommodate at least two passengers riding in a side-by-side fashion with their feet extending forward. Further, the passenger compartment 15 is intended to accommodate two seats placed side-by-side in the rear of the passenger compartment on a slight incline 20 to increase the comfort of the passengers and ability of the operator to safely drive the vehicle. Moreover, the seats are located in a horizontal passenger support plane, which lies low in the frame 24 and below the top wheel plane 23, as drawn between the upper surface of the front and rear wheels, in order to maintain a lower center of mass, thus increasing vehicle stability and minimizing risk of rollover.

The frame 10 also includes a roll-bar construction 26 which laterally surrounds the passenger compartment 15. Generally, the distance from the top of the roll-bar construction 26 to the bottom of the vehicle frame 10 is no more than approximately 46 inches 28. Any configuration suitable to protect the occupants can be applied as part of the roll bar structure.

The frame 10 is further configured for a rearward engine compartment 25 intended to house the engine, power train, and transmission of the vehicle. The compartment may house a 697 cubic centimeter, two-cylinder, four stroke, liquid-cooled engine with an automatic transmission. Such power train systems are available the Polaris Corporation, or other sources with similar combined engines and transmission systems. The engine may be equipped with a high and low range transfer case, that includes park and reverse. The engine compartment 25 may also be equipped with a top plate mounted to the top of the engine compartment for storage. The storage space provided above the engine compartment is generally about 10 cubic feet. This amount of storage space is unusually large for ATV vehicles and is particularly advantageous for cross-country applications.

The frame 10 is further configured to receive a steering wheel 30 and instrument panel 35 for direction control and operation of the vehicle. The instrument panel 35 may be equipped with a single round-faced VDO instrument cluster that gives a steady flow of information: RPM, speed, odometer, trip odometer, hour meter, engine service light, battery indicator, and fuel gauge with empty, full and five intermediate ticks. The steering system 30 may be a rack and pinion design intended to minimize jerking of the steering wheel and maximize control of the vehicle. A winch 31 may be attached to the front of the frame and a trailer hitch 32 may be attached at the rear of the frame.

The frame 10 further comprises a vertical, support truss 40 down the center axis of the vehicle. The preferred embodiment shows the support truss 40 dividing the passenger compartment 15 into a driver section and a passenger section for receiving a pair of seats; however, the support truss could be configured in an alternate form so as to comprise multiple parallel members within the passenger compartment 15. The support truss 40 increases the rigidity of the frame 10 sufficient enough to eliminate an outer truss member providing the operator and passenger with easier ingress into and egress from the vehicle.

The frame 10 is further configured such that a mounting plate 45 may be positioned between the engine and the main support truss 40. The mounting plate 45 may be utilized to separate the engine compartment 25 from the passenger compartment 15 and provide additional support for placement of the passenger seats. Lateral support members 50 are positioned transverse to the main support truss 40 and coupled to the main support truss 40 just below the passenger seats 40a and to the outer frame 10 at 55 to add stability to the overall frame 10.

The frame 10 may also be configured to receive lighting fixtures 60 that are located within the frame 10 at 65 so as to minimize the risk of breakage from collision. Additional lighting fixtures may be attached to the roll bar 26 at 70.

At both the front and rear portions of the frame 10 at least one pair of swept A-frame non-slip differential suspension members 75 are movably coupled to the frame 10 in a cantilever-like fashion. The suspension members are each independent of the others giving the vehicle increased stability over uneven terrain and increased climbing ability. The swept A-frame members are coupled to the frame 10 at diverging ends 80 with the converging ends coupled to the wheel hub 85. One of the swept A-frame members is shorter in length than the other as contrasted in 90 (shorter) and 95 (longer). The swept A-frame members allow the converging portion 85 of the swept A-frame member 75 to be positioned either more forward or more backward than the converging portion of a normal A-frame suspension.

Depending on whether the forward member is the shorter of the two members or the rearward member is the shorter of the two members, the converging portion 85 will be more forward or more backward than the converging portion of a normal A-frame suspension. In the embodiment shown, the forward suspension members have a shorter rearward member 90 and a longer forward member 95, the shorter rearward member being generally aligned for attachment to the central hub of the front wheel. The configuration of the swept A-frame 75 allows the diverging ends of the swept A-frame 80 to be connected to the vehicle frame approximately 6 inches back from where the diverging ends of a normal A-frame suspension would be attached while still proving the necessary load support. The end result is that the converging portion of the swept A-frame 85 is approximately 6 inches back from the converging point of a normal A-frame, thereby moving the front end of the forward wheelbase back 6 inches.

Additionally, in the preferred embodiment shown, the rearward suspension members have a shorter forward member 100 and longer rearward member 105, the shorter forward member being generally aligned for attachment to the central hub of the rear wheel. Similar to the forward swept A-frame, the configuration of the swept A-frame 75 allows the diverging ends of the swept A-frame 80 to be connected to the vehicle frame approximately 6 inches forward from where the diverging ends of a normal A-frame suspension would be attached while still proving the necessary load support. The end result is that the converging portion of the swept A-frame 85 is approximately 6 inches forward from the converging potion of a normal A-frame identically coupled to the vehicle frame as in 80, thereby moving the rear end of the rearward wheelbase forward 6 inches. By moving the forward wheelbase back 6 inches and the rearward wheelbase forward six inches, the overall longitudinal wheelbase length of the vehicle is shortened by 12 inches, yet the vehicle frame remains the same length.

Each suspension member also comprises at least one shock-absorbing device 115 coupled at one end to the rigid vehicle frame 10, and at the other end near to the converging ends of the swept A-frame 85, or along the axis of a structural member of the swept A-frame 120 which is transverse to the shorter swept A-frame member. Furthermore, the rearward suspension members are accompanied each by a swept driving axle 125 which attaches to the wheel hub 130 approximately one inch forward from where it attaches to the power train of the vehicle. At the connection point 130, the swept driving axles are connected to U joints which give the wheels additional movement.

Additional A-frame suspension members may be positioned vertically above either the forward suspension members, or the rear suspension members, or both. The additional A-frame suspension members are also located between the wheel mount and vehicle frame, forming a substantial parallelogram configuration with the primary A-frame suspension members for enhanced suspension response of the wheels over rough terrain.

A variety of wheel sizes 135 may be attached to the wheel hub ranging from 8 to 18 inches wide and from 24 to 48 inches in diameter. Additionally, a variety of wheel types 135 may also be attached to the wheel hub ranging from studded, all weather, snow, and sand dune tires. In a preferred embodiment, once wheels are attached to the suspension system, the lateral width of the vehicle, as measured from the vertical plane of the outside edge of lateral opposing wheels, does not exceed approximately 58 inches.

Additionally, the traditional operators of ATVs have been average sized men. Thus, the placement of accelerator and braking mechanisms has traditionally accommodated the average sized man. However, a small man, a juvenile, or a woman attempting to operate the accelerator and braking mechanisms of an ATV configured for an average sized man would have difficulty reaching the mechanism. An ATV configured for smaller operators would increase manufacturing costs and limit the marketability of any specially produced ATV. It would be advantageous to have an accelerator and braking mechanism that could be adjusted by the operator to accommodate any operator size.

Figure 4:
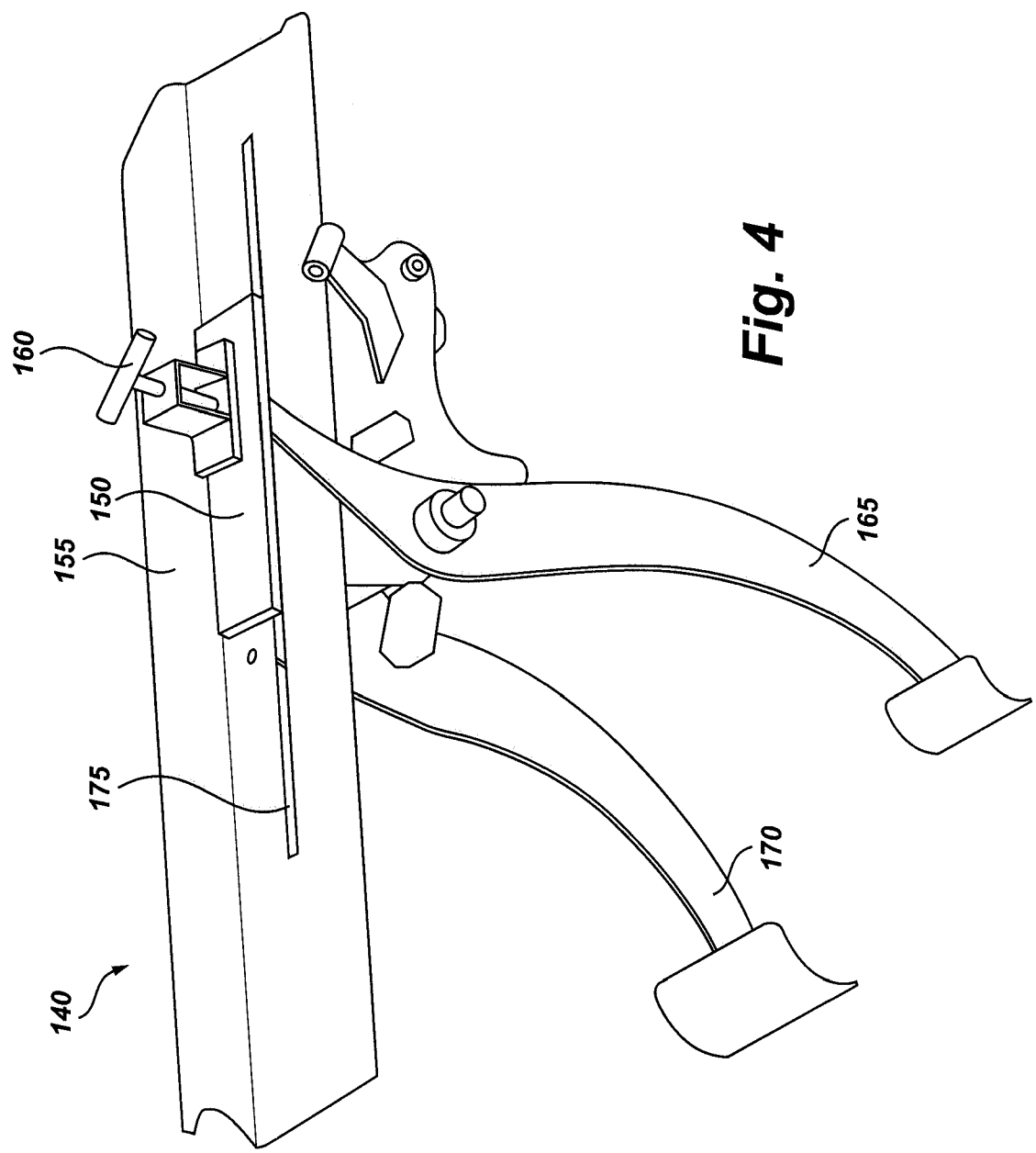
FIG. 4 is a perspective view of the adjustable pedal assembly with an accelerator pedal and brake pedal attached in accordance with an embodiment of the present invention.

Referring to FIGS. 1 and 4. An adjustable pedal assembly 140 may be attached to the frame 10 in the leg space of the passenger compartment at 145. The pedal assembly 140 comprises a movable tracking member 150 journaled into a stationary assembly member 155, said stationary member being attached to the vehicular frame 10. The assembly is tightened to the journaled area of the stationary member so as to be temporarily immovable. The assembly is tightened by a fastening device 160 attached to the tracking member 150 which capable of being tightened or loosened by any vehicle operator. The movable tracking member 150 also comprises an accelerator pedal 165 and a braking pedal 170. The assembly could contain a multiplicity of pedals each with their own respective objects of operation including but not limited to the transmission, winch, lights, and additional hydraulically operated devices. The pedals, 165 and 170 are placed such that each may be displaced to accelerate of brake the vehicle. The journaled portion 175 of the adjustable assembly 140 can be constructed so as to allow longitudinal displacement of the pedal up to 6 inches.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An all terrain, four-wheeled vehicle frame for carrying at least two passengers in side-by-side riding configuration, comprising:
   a rigid, tubular frame body providing (i) a forward passenger compartment having structural support members for carrying a pair of seats for the side-by-side passengers and (ii) a rearward engine compartment configured for receiving an engine, power train, and transmission for driving wheels of the vehicle;
   a vertical, load-bearing truss member extending generally along a longitudinal, central axis of the vehicle within the passenger compartment, said truss member being coupled to a front portion and an opposing back portion of the tubular frame body and forming a load-bearing structural member between the pair of seats.

2. A vehicle frame as defined in claim 1, wherein the load-bearing truss member extending along the central axis of the vehicle within the passenger compartment divides said compartment into a driver section and a passenger section for receiving the pair of seats.

3. A vehicle frame as in claim 1, wherein the passenger section for receiving the pair of seats includes a horizontal, passenger support plane positioned at a seat level of the pair of passenger seats, said passenger support plane lying below a top wheel plane positioned at an upper surface of the front and rear wheels, thereby providing a low center of mass for passengers within the passenger seats.

4. A vehicle frame as in claim 1, further comprising a mounting plate positioned between the engine compartment and the passenger compartment.

5. A vehicle frame as in claim 1, wherein said vehicle frame is configured to receive a steering mechanism mounted to said frame within the passenger compartment.

6. A vehicle frame as in claim 1, further comprising lateral support members positioned between the center support truss and an outer portion of the vehicle frame, said lateral support members being coupled to said truss and the outer portion of the vehicle frame.

7. A vehicle frame as defined in claim 1, further comprising a forward suspension system for front wheels of the vehicle including at least one pair of A-frame members movably coupled at diverging ends to the frame body for vertical displacement over uneven terrain and converging portions coupled together for attachment of a wheel mount at an apex of the A-frame, said converging portions having one member of the A-frame having a shorter length than the opposing member of the A-frame.

8. A vehicle frame as defined in claim 7, wherein once wheels are attached to said suspension system, the vehicle is sized and configured to be transported in the bed of a standard pickup truck.

9. A vehicle frame as defined in claim 1, further comprising a rearward suspension system for rear drive wheels of the vehicle including at least one pair of rear A-frame members movably coupled at diverging ends to the frame body for vertical displacement over uneven terrain and converging portions coupled together for attachment of a wheel mount at an apex of the rear A-frame, said converging portions having one member of the A-frame having a shorter length than the opposing member of the A-frame.

10. An all terrain, four-wheeled vehicle frame for carrying at least two passengers in side-by-side riding configuration, comprising:
    a rigid, tubular frame body providing (i) a forward passenger compartment having structural support members for carrying a pair of seats for the side-by-side passengers and (ii) a rearward engine compartment configured for receiving an engine, power train, and transmission for driving wheels of the vehicle;
    a forward suspension system for front wheels of the vehicle including at least one pair of A-frame members movably coupled at diverging ends to the frame body for vertical displacement over uneven terrain and converging portions coupled together for attachment of a wheel mount at an apex of the A-frame, said converging portions having one member of the A-frame having a shorter length than the opposing member of the A-frame.

11. A vehicle frame as in claim 10, said converging portions of the A-frame being swept back rearward opposite the direction of forward vehicular travel with one rearward member of the A-frame having a shorter length than a forward member of the A-frame.

12. A vehicle frame as in claim 10, further comprising an additional A-frame suspension member positioned vertically above the at least one pair of A-frame members and between the wheel mount and vehicle frame in a substantial parallelogram configuration for enhanced suspension response of the wheels over rough terrain.

13. A vehicle frame as in claim 10, further comprising at least one shock-absorbing member coupled to the vehicle frame positioned generally transverse to the longitudinal axis of said vehicle frame being generally aligned with the A-frame members.

14. An all terrain, four-wheeled vehicle frame for carrying at least two passengers in side-by-side riding configuration, comprising:
    a rigid, tubular frame body providing (i) a forward passenger compartment having structural support members for carrying a pair of seats for the side-by-side passengers and (ii) a rearward engine compartment configured for receiving an engine, power train, and transmission for driving wheels of the vehicle;

a rearward suspension system for rear drive wheels of the vehicle including at least one pair of rear A-frame members movably coupled at diverging ends to the frame body for vertical displacement over uneven terrain and converging portions coupled together for attachment of a wheel mount at an apex of the rear A-frame, said converging portions having one member of the A-frame having a shorter length than the opposing member of the A-frame;

a drive axle coupled between wheels and the engine compartment and configured for attachment to the power train.

15. A vehicle frame as in claim 14, said converging portions of the A-frame being swept forward in the same direction as forward vehicular travel with one forward member of the A-frame having a shorter length than a rearward member of the A-frame.

16. A vehicle frame as in claim 14, further comprising an additional rear A-frame suspension member positioned vertically above the at least one pair of rear A-frame members and between the wheel mount and vehicle frame in a substantial parallelogram configuration for enhanced suspension response of the wheels over rough terrain.

17. A vehicle frame as in claim 14, further comprising at least one shock-absorbing member coupled to the vehicle frame positioned generally transverse to the longitudinal axis of said vehicle frame being generally aligned with the A-frame members.

* * * * *